United States Patent [19]
Haupt et al.

[11] Patent Number: 5,386,213
[45] Date of Patent: Jan. 31, 1995

[54] CODER AND DECODER APPARATUS FOR A DATA TRANSMISSION SYSTEM

[75] Inventors: Deiter Haupt, Springe; Friedhelm Holtz; Heinz W. Keesen, both of Hanover, all of Germany

[73] Assignee: Deutsche Thomson-Brandt GmbH, Villengen-Schwenningen, Germany

[21] Appl. No.: 74,579

[22] Filed: Jun. 8, 1993

[30] Foreign Application Priority Data

Jun. 9, 1992 [DE] Germany ............................ 4218695

[51] Int. Cl.⁶ ............................................ H03M 7/40
[52] U.S. Cl. ...................................................... 341/67
[58] Field of Search .................. 341/67, 68, 54, 55; 358/135

[56] References Cited

U.S. PATENT DOCUMENTS 4,580,162 4/1986 Mori .................................... 358/135
5,047,852 9/1991 Hanyu et al. ....................... 358/133

FOREIGN PATENT DOCUMENTS 3702490 11/1988 Germany .
3925663 2/1991 Germany .
1388879 4/1988 U.S.S.R. .
91/01954 10/1990 WIPO .

*Primary Examiner*—Brian K. Young
*Attorney, Agent, or Firm*—Joseph S. Tripoli; Eric P. Herrmann; Ronald H. Kurdyla

[57] ABSTRACT

For transmission of coded picture data, coded data may be arranged in blocks having a predetermined average length. Blocks which are not full are filled with data from other blocks. To support decoding in the presence of interference, each of the blocks additionally contains an address pointer which points to addresses in a decoder memory from which data separated from blocks having a greater than the average word length are reconstituted and used for decoding. The additional address pointer information, for a constant channel capacity, results in a lower data rate for picture data, which may lead to reduced picture quality during undisturbed decoding. Respective recovery pointer pairs having full word width are inserted between a predetermined number of data blocks, whereby other address pointers only cover the Least Significant Bits having full word width. Accordingly, additional data can be inserted into the data stream.

12 Claims, 2 Drawing Sheets

CODER AND DECODER APPARATUS FOR A DATA TRANSMISSION SYSTEM

FIELD OF THE INVENTION

The invention relates to coder and decoder apparatus such as may be used in a digital data processing system.

BACKGROUND OF THE INVENTION

Data transmission method and apparatus are described in EP-A-88 100 830 in which data from picture element (pixel) blocks are transformed into coefficients and afterwards coded as variable length words. The coefficients are recorded coded in blocks having a predetermined average length. Blocks which are not full are filled with intermediately stored data words from other blocks. In order to improve the immunity to interference, dc components and important alternating components of the transformed coefficients are recorded at fixed intervals. However, if faults occur in the transmission channel or in the storage medium, data of one block which has been distributed among other blocks may be difficult or impossible to decode.

For this reason, in accordance with PCT/EP91/01954, each of the blocks may additionally contain an address pointer which, upon the occurrence of transmission and/or read errors during subsequent decoding, points to addresses in memory from which data components separated from blocks having a greater than the average word length can be recovered and used for decoding.

Due to the additional address pointer information, for a constant channel capacity, there is a lower data rate available for picture data. This may lead to reduced picture quality during normal decoding.

SUMMARY OF THE INVENTION

In accordance with the present invention, there is provided an improved system for the transmission and storage of data which makes it possible to have good picture quality in normal operation, and decoding in the event of a fault.

With known methods of picture data reduction, blocks of data, especially pixel data, exhibit on average a length of "m" bits. This average number of m bits is an average block length m. For transmission or recording, the blocks are arranged such that the beginnings of blocks are located at fixed intervals using the average block length m (raster).

Each block of useful data contains an address flag (FL), an address pointer with the least significant bits (LSBs) of a physical address and the data (useful bits) including the most important information components for this block, such as a dc component and important (e.g., the larger) alternating components from a DCT transformation (discrete cosine transform). The useful data length of the block which is necessary is referred to hereinafter as actual block length BL. BL may be larger, equal to or smaller than average block length m.

For example, if BL>m, then FL=0, and if BL≦m, then FL=1. In the first case, data exceeding the average block length is intermediately (temporarily) stored with the aid of the pointer address in order to transmit it by attaching it to the useful bits in blocks having block length BL<m. In the second case, the useful bits of the current useful data block are initially transmitted. Thereafter, with the aid of the pointer address, the useful bits of other blocks exceeding average block length m are read out of a buffer storage device (memory). For the method in accordance with the invention, it is irrelevant whether the case FL=m is associated with address information flag FL of value "0" or "1". In addition, recovery pointer pairs REC are inserted in each case between a predetermined number, e.g., 6 or 8, of useful data blocks or picture lines—hereinafter referred to as block groups. These recovery pointers are complete address words. One pointer POI0 of this pointer pair provides a real write address for the buffer by which data exceeding the average block length or alternating components of blocks having BL>m are intermediately stored. The other pointer POI1 of this pointer pair provides a real read address for the buffer at which the respective, not yet transmitted oldest items of data exceeding the average block length or alternating components of blocks having BL>m were intermediately stored. Advantageously, by using the recovery pointer pairs and the shortened address pointer to the LSB's, additional data can be inserted into the data stream without disturbing the coding/decoding operation. This may occur, for example, at the end of the blocks.

The disclosed method in accordance with the invention serves for the transmission and/or storage of data in which, at the coder, data are initially converted section by section into digital signals having different word lengths. Afterwards, using a first memory, coded data words are assigned to blocks of constant average word length. Selected data components including a dc component and the most important alternating components from a respective pixel block transformation from the sections of the digital signals are disposed in each of these blocks. Thereafter, blocks having a smaller than average word length, which were previously stored using address pointer information having read and write addresses, are filled with data components separated from blocks having a greater than average word length, wherein address information is simultaneously transmitted and/or stored. At the decoder, the blocks are reconstituted in accordance with their original different word lengths by using a second storage device and the address information. Separated data components from blocks having a greater than average word length are respectively appended to the selected data components pertaining thereto in time.

At the coder, before the beginning of each group of a predetermined number of blocks, a corresponding write and read address having the full word width is transmitted and/or recorded. The address pointer information pertaining to a block contains such a number of LSB's of the full word width of the write or read address for the block which corresponds to the difference between a predetermined maximum word length and the average word length.

At the decoder, the write and read addresses having the full word width for the block groups and the write or read addresses for each block are determined from the transmitted/recorded data stream. The blocks are reconstituted in accordance with their original different word lengths by using the second storage device and these addresses. The separated data from blocks having a greater than average word length are respectively appended to the selected data components pertaining thereto in time, whereby, after an interruption or disturbance of the transmitted and/or recorded data stream, fault-free decoding is enabled with the aid of the write and read addresses having the full word width.

A disclosed coder in accordance with the invention converts data section by section into digital signals having different (variable) word lengths. A downstream multiplexer forms blocks of constant average word length by using a downstream first storage device, whereby selected data components, in particular, a dc component and important alternating components with their associated addresses, from the sections of the digital signals are stored for each of these blocks in the first storage device. Blocks having a smaller than average word length are filled with data components separated from blocks having a greater than average word length. A demultiplexer downstream of the storage device which packs the data pertaining to a respective block passes it to a data channel. A circuit fed from the first storage device calculates the address pointer which controls the multiplexer and the demultiplexer, and supplies to the first storage device for each block, an address information flag and a write or read address having reduced word width, and for each group of blocks a write and a read address having the full word width.

A disclosed decoder in accordance with the invention is provided with an address pointer decoding circuit connected downstream of a channel for separating and conveying for each block an address information flag and a write or read address having reduced word width and, for each group of blocks a write and a read address having the full word width, to an address calculating circuit. A multiplexer following the address pointer decoding circuit, together with a downstream second storage device, reconstitutes the data blocks into their original different word lengths. A downstream demultiplexer packets data pertaining to a respective block and passes it to a variable length decoder at the output of which data corresponding to the source data during coding is available. The address calculating circuit controls the multiplexer and demultiplexer, and supplies the corresponding addresses to the second storage device.

DETAILED DESCRIPTION OF PREFERRED EMBODIMENT

Figure 1:
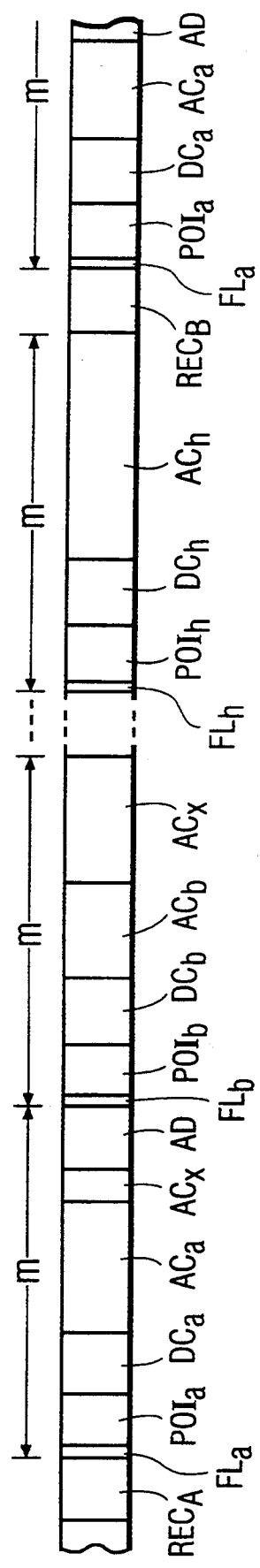
FIG. 1 shows a pictoral arrangement of data blocks including recovery information according to the invention.

In FIG. 1, useful data blocks of average block length m contain, in addition to a direct component DC and an alternating component AC, address pointer information $POI_a \ldots h$ and address information flag $FL_a \ldots h$. The data items of the first block carry the index "a", those of the second the index "b", and those of the eighth the index "h". Index "0" indicates a write pointer, and index "1" indicates a read pointer. The remaining capacity of the blocks may be filled with additional items of data or with alternating components $AC_x$ from other blocks. Additionally, a block may contain further data needed for decoding, e.g., a flag which indicates whether it was coded motion-adaptively using either 8*8 or 4*8 DCT processing, and/or information regarding the activity in a block and/or error correction information. An 8*8 DCT is advantageously used for static images, and a 2*(4*8) DCT for dynamic images in interlaced picture signals.

Additionally, in accordance with the invention, recovery pointer pairs $REC_A$, $REC_B$, ..., which comprise the full write and read addresses for buffer storage means, are inserted at regular intervals using, for example, 20 bits for a buffer store of 1 Mbit. The respective address pointers $POI_a \ldots h$ for the current data block contain only the last bits of a write or read address for the buffer store: $POI_0$ or $POI_1 = REC + |BL - m|$.

Thus the word length of the address pointer corresponds to the maximum occurring or permissible number of bits of a useful data block, or of the useful bits minus average block length m. If a large block has, e.g., 500 bits, then the word length of the address pointer is set to a minimum of 9 bits ($2^9 = 512$). If, for example, m=20 bits, BL=50 bits, write pointer POI0 of recovery pointers $REC_A$ stands at address 100 and read pointer POI1 at address 0, then, in the next following useful data block, $FL_a = 0$ and $POI_{0a} = 100 + |50 - 20| = 130$. If the block thereafter has BL=18, then $FL_b = 1$ and $POI_{1b} = 0 + |18 - 20| = 2$ in this data block. If the following block has BL=30, then $FL_c = 0$ and $POI_{0c} = 130 + |30 - 20| = 140$. If, as described below, no additional items of data AD are inserted, recovery pointers $REC_B$ result from the corresponding summation of the values for $POI_a \ldots h$.

Due to the dividing up of the pointer information in accordance with the invention, an additional 2*20 bits are needed every few, e.g., 6–8 blocks. However, compared to the system disclosed in PCT/EP91/01954, 11 bits are saved (20−9=11) in each useful data block with the present system. The overall data rate for the pointer information drops and the quality of (picture) data coding can increase correspondingly. With the aid of the recovery pointers, one can decode further, free from error, after a disturbance in the transmission or reproduction paths.

It is particularly advantageous that, due to double pointers REC and POI, additional data items AD can be inserted into the previously described data stream without disturbing its operation, even after an error. A useful data block may contain data such as FL/POI/DC/AC or additionally, $AC_x$, AD. In each case, for a non-constant overall data stream, the data stream must be controlled, using usual regulating methods (e.g., quantization), such that no over- or under-flow of storage devices occurs during intermediate data storage. This regulation can be derived from the values of REC.

In a digital video recorder for example, it is possible to read from a storage medium in the rapid search mode, the data tracks relating to a certain separation between one recovery pointer and the next (including error protection). Due to the absolute address REC, the corresponding section of a picture can be displayed at the correct location on a display. With certain coding methods for the transmission (e.g., terrestrial or satellite supported emission of digital TV signals) or recording of picture signals (e.g., MPEG), there are intra-frame and inter-frame coded pictures where each coded pixel block contains an end-of-block marker. In a system using the principles of the present invention, inter-frame coded pixel blocks may be transmitted or recorded as additional data AD, and intra-frame coded pixel blocks using dc components DC and alternating components AC or $AC_x$, whereby the end-of-block marker of intra-frame coded pixel blocks is not needed because block length BL can be determined at the decoder from the pointer information. The inter-frame blocks therefore may be derived from different time regions.

Figure 2:
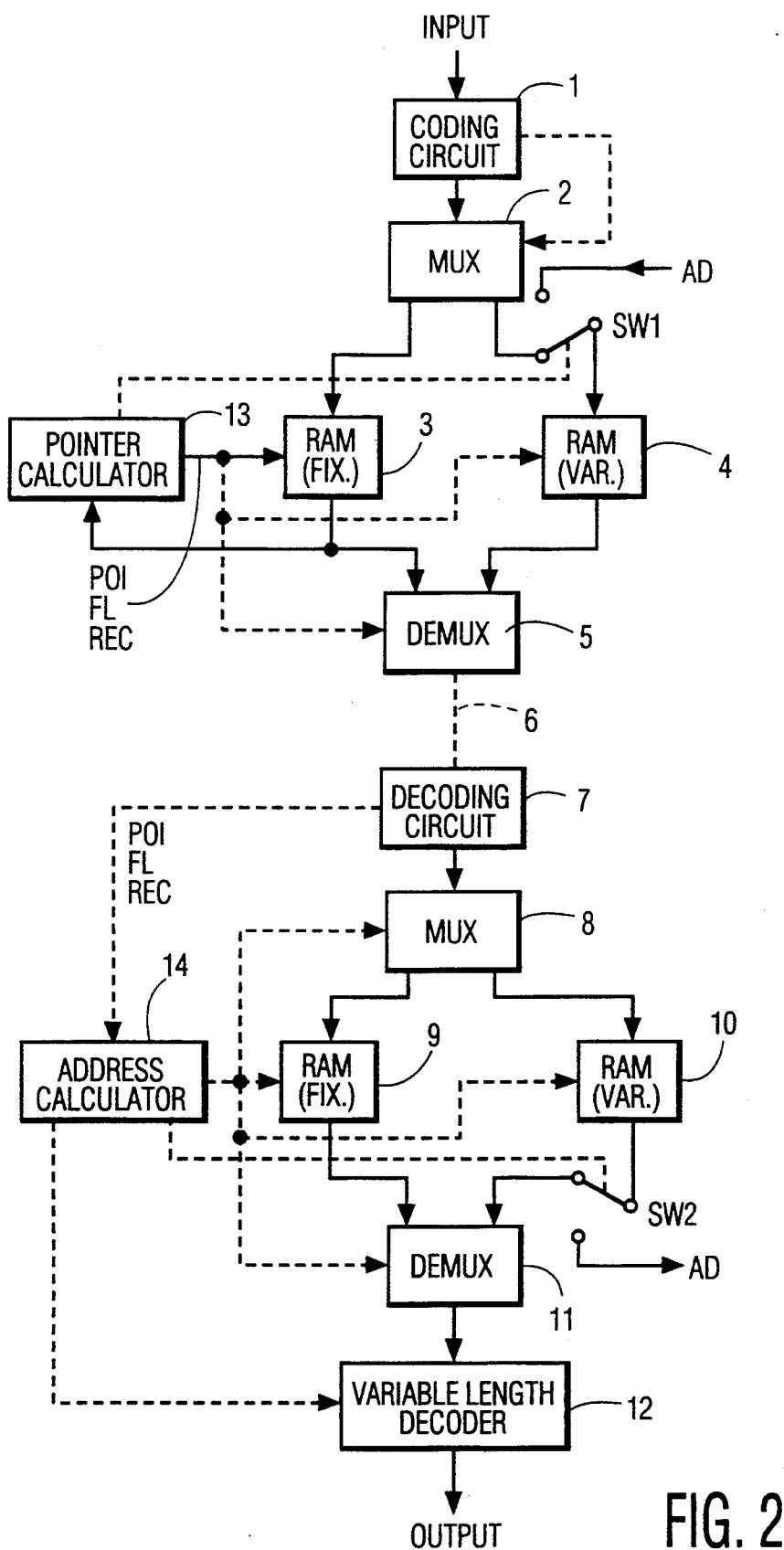
FIG. 2 is a block diagram of coder and decoder apparatus in accordance with the invention.

FIG. 2 depicts a coder and decoder system according to the present invention. Items of DCT transformed picture data, for example, are quantized, coded with variable lengths (VLC), and provided with addresses for alternating components by a coding circuit 1. In accordance with the ensuing block lengths, a downstream multiplexer 2 distributes the block data over following dual port RAMs 3 and 4. Recovery pointer pairs REC, address information flags FL and address pointers POI are simultaneously written into dual port $RAM_{FIX}$ 3 as fixed data information for each block by a circuit 13 for calculating the pointer. From this data, circuit 13 also forms the address information for dual port $RAM_{VAR}$ 4 for the buffer storage of the interim surplus useful bits. For FL=0, $POI_0$ indicates which address dual port $RAM_{VAR}$ 4 has been written to with data. For FL=1, $POI_1$ indicates which address the items of data, which belong to other blocks, are read out from dual port $RAM_{VAR}$ 4. In a demultiplexer 5 coupled to dual port RAMs 3 and 4, the useful bits are brought back together again and conveyed to a channel or storage medium 6 together with data items REC, FL and POI.

With information decoded by a pointer decoding circuit 7, an address calculator circuit 14 provides the necessary address information for a dual port $RAM_{FIX}$ 9 and for a dual port $RAM_{VAR}$ 10. As described above, for FL=0, $POI_0$ at the decoder indicates the address from which useful bits are read out from dual port $RAM_{VAR}$ 10 to a variable length decoder 12. This decoder exhibits the inverse of the function performed by coding circuit 1. For FL=1, $POI_1$ indicates the address to which data is written into dual port $RAM_{VAR}$ 10. In a manner corresponding to the coder, a corresponding multiplexer 8 arranged between address pointer decoder 7 and RAMs 9 and 10, and a corresponding demultiplexer 11 is arranged between these RAMs and variable length decoder 12. Other storage devices such as magnetic disks or optical storage devices, for example, may also be used instead of dual port RAMs.

At the input of dual port $RAM_{VAR}$ 4 in the coder, a switch SW1 controlled by pointer calculating circuit 13 may be used to read in additional data items DA as described above. At the decoder, a corresponding switch SW2 controlled by address calculating circuit 14 is used at the output of the dual port $RAM_{VAR}$ 10 for selectively conveying additional data DA.

The use of buffer storage at the coder normally ensures that the read pointer does not "overtake" the write pointer (i.e., where it is attempted to read out data from storage that have not yet been written in at a certain point in time). Pointer calculating circuit 13 can additionally assure this by an appropriate comparison of the pointers. Also, a variable codeword, which is not used at the decoder and which has a very large word length for example, may be inserted into the data stream.

If, for example, many blocks having BL=m follow a block having BL>m, the surplus useful bits may not be available for so long at the decoder, due to continuing transmission or storage, that upon arrival of a block having BL<m these useful bits can no longer be allocated due to limited RAM storage capacity. To avoid this condition, data items may be regularly, forcibly removed from RAM 4 by appropriate control, e.g., one bit or byte per useful data block or 10% of the average block length m. This data removal is compensated for by regulation of the buffer.

An addition, the storage means at the coder and decoder may be simultaneously used as quantization buffers. In such case the address difference between the write and read pointers advantageously indicates the fill-level of these quantization buffers.

We claim:

1. Encoding apparatus for use in a data processing system, said apparatus comprising
   a coding circuit for converting an input signal into a digital signal having variable length words;
   a memory for storing said digital signal in data blocks of constant average word length, said blocks containing DC information and other predetermined information, with blocks of less than average word length being filled with data separated from blocks of greater than average word length;
   an address generator coupled to said memory for providing write/read address information to facilitate the storage and subsequent recovery of stored block data including said separated data; wherein said address information includes
   (a) full word width Group Address information preceding each group of a predetermined number of data blocks; and
   (b) less than full word width Block Address information associated with respective individual data blocks and comprising a number of least significant bits representing a difference between a predetermined word length and said average word length; and
   output means for conveying said data blocks together with said address information as an output datastream.

2. Apparatus according to claim 1 and further including
   means coupled to said memory for inserting additional data in the form of separated data into a datastream including said data blocks and address information.

3. Apparatus according to claim 1, wherein
   said address generator includes provision for comparing addresses to preventing overstepping of write addresses by read addresses.

4. Apparatus according to claim 1, wherein
   said apparatus includes provision for insertion into said datastream of a large codeword not subject to being considered by a decoder.

5. Apparatus according to claim 1, wherein
   a predetermined number of bits per average word length is extracted from said memory and inserted into said datastream.

6. Apparatus according to claim 1, wherein
   said memory operates as a quantization buffer in response to a difference between write and read addresses providing an indication of buffer fullness.

7. Apparatus according to claim 1, comprising
   a multiplexer responsive to an output signal from said coding circuit for forming blocks of average width and for providing output signals to said memory;
   demultiplexer output means responsive to output signals from said memory for packing together time associated data of a given data block and providing packed data to an output path; and
   means for coupling said address generator to said multiplexer, demultiplexer and memory, including means for coupling said address information to control inputs of said multiplexer and demultiplexer.

8. Apparatus according to claim 7, wherein
said memory includes a first section, and a second section for interim storage of said separated data; and said apparatus further includes:
means for coupling, to said first and second memory sections, said Group Address data, said Block Address data, and an address flag generated by said address generator.

9. Decoder apparatus for use in a data processing system, said apparatus comprising:
an input circuit for receiving a digital signal datastream comprising variable length words segmented into data blocks of average length containing DC information and other predetermined information, with blocks of less than average word length having been filled with data separated from blocks of greater than average length, said datastream also including
  (a) full word width Group Address data containing write/read information preceding each group of a predetermined number of said data blocks; and
  (b) less than full word width Block Address data containing write/read information associated with respective individual data blocks and comprising a number of least significant bits representing a difference between a predetermined word length and said average word length;
said input circuit including a decoding circuit for recovering said Group Address information and said Block Address information; and
a processing circuit, including a memory, responsive to output signals from said input circuit, including said Group and Block Address information, for reconstituting data blocks in accordance with original variable word lengths wherein separated data from blocks of greater than average word lengths are respectively appended to data associated therewith in time, whereby in the presence of a data path disturbance a likelihood of continued error-free decoding is enhanced with the assistance of said group address information.

10. Apparatus according to claim 9, wherein
said datastream further includes additional data components; and
said processing circuit includes means for extracting said additional data components from said datastream, wherein the beginning and end of said additional data components are detected as a function of a difference between respective group address information and Block Address information.

11. Apparatus according to claim 9, wherein
said memory operates as a quantization buffer in response to a difference between write and read addresses providing an indication of buffer fullness.

12. Apparatus according to claim 9, comprising
an address calculating circuit for receiving said Group Address information and said Block Address information from said decoding circuit for providing data address information;
a multiplexer coupled to said decoding circuit and to said address calculating circuit;
a memory coupled to said multiplexer and to said address calculating circuit for reconstituting data blocks in original variable word length form;
a demultiplexer for packing data associated with respective blocks;
a variable length decoder responsive to signals from said demultiplexer; and
means for coupling said address calculating circuit to said multiplexer and demultiplexer.

* * * * *